April 17, 1934.   A. WARMISHAM   1,955,617
PHOTOGRAPHIC AND PROJECTION LENS
Filed Jan. 27, 1931

INVENTOR
Arthur Warmisham
BY Arthur L. Kent
his ATTORNEY

Patented Apr. 17, 1934

1,955,617

UNITED STATES PATENT OFFICE 1,955,617

PHOTOGRAPHIC AND PROJECTION LENS

Arthur Warmisham, Leicester, England, assignor to Kapella Limited, Leicester, England, a corporation of England Application January 27, 1931, Serial No. 511,454 In Great Britain January 28, 1930

3 Claims. (Cl. 88—57)

This invention relates to photographic and projection lenses, of the Petzval type, and especially to those of modified Petzval type described in U. S. patent application Serial No. 132,591 and its continuation, Serial No. 402,837; and its object is to improve the field flatness of such lenses, while still retaining the high relative aperture.

The typical Petzval lens may be improved in the above respects by constructing the divergent member of the rear component, hitherto a simple element, as a compound member comprising a highly refractive convergent member and a divergent element of lower refractive index, preferably but not necessarily cemented together to reduce the number of air-glass surfaces to a minimum.

The front component of a Petzval type lens is convergent, and hence, if the front surface of the rear component is formed concave towards the incident light, the marginal rays from the front component will strike such surface at a high angle of incidence and consequently produce a high degree of spherical aberration. According to the present invention, therefore, the front surface of the rear component is formed convex to the incident light to reduce such angle of incidence and the consequent spherical aberration.

It is also advantageous to split up the single simple convergent member of the rear component into two simple convergent lenses, and also to form the front component of two compound members, the cemented surfaces of which are dispersive.

Various forms of lenses constructed in accordance with the present invention are shown, by way of example, in the accompanying drawing, wherein.

The constructions shown are merely illustrative of the various forms which may be used.

Figure 1:
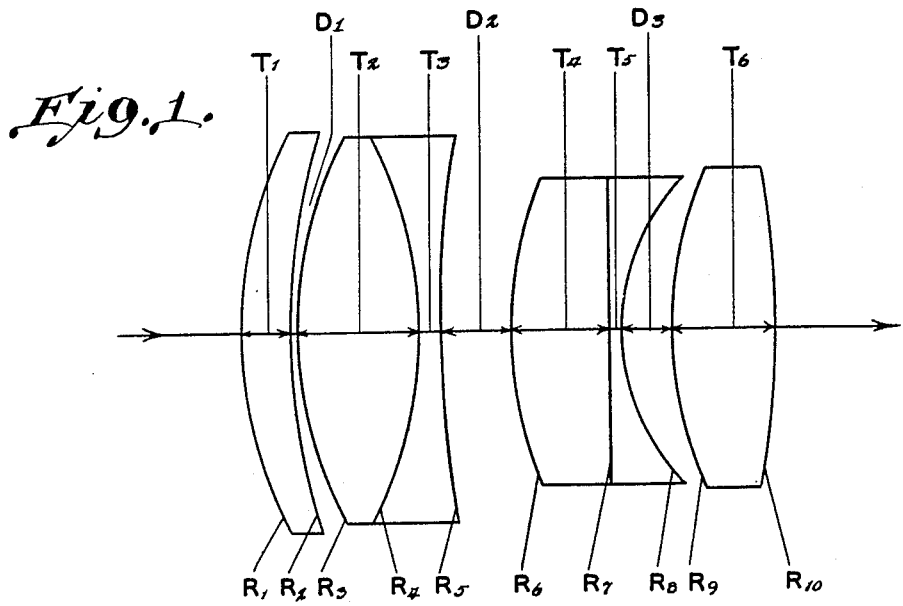
Fig. 1 shows a lens having a front component formed of a simple convergent member and a compound convergent member, and a rear component formed of a compound divergent member and a single simple convergent member.

The numerical data for an objective of relative aperture F/1.5, constructed according to the present invention, as illustrated in Fig. 1, is given below. The notation used is that the successive radii of curvature, counting from the front, are called $R_1$, $R_2$, etc., the sign $+$ denoting that the curve is convex toward the front, and $-$ that it is concave toward the front. The axial thicknesses of the elements are denoted by $T_1$, $T_2$, etc., and the separations of the members by $D_1$, $D_2$, etc. The material is defined in terms of the mean refractive index $n_D$, as conventionally employed, followed by the Abbe V number, and further by the type-number in Messrs. Chance Brothers' optical glass catalogue.

Equivalent focal length 1.059"

|  |  |  | $n_D$ | V | Chance Bros. catalogue number |
|---|---|---|---|---|---|
| $R_1+$ .8831 | $T_1$ | .096 | 1.5735 | 57.5 | 9002 |
| $R_2+$1.454 | $D_1$ | .002 | Air |  |  |
| $R_3+$ .7005 | $T_2$ | .230 | 1.5181 | 60.3 | 9322 |
| $R_4-$ .7930 | $T_3$ | .032 | 1.6521 | 33.5 | 5093 |
| $R_5+$1.775 | $D_2$ | .130 | Air |  |  |
| $R_6+$ .7247 | $T_4$ | .180 | 1.6437 | 48.3 |  |
| $R_7$ ∞ | $T_5$ | .020 | 1.5635 | 42.9 | 8653 |
| $R_8+$ .3922 | $D_3$ | .090 | Air |  |  |
| $R_9+$ .7500 | $T_6$ | .200 | 1.6437 | 48.3 |  |
| $R_{10}-$2.559 |  |  |  |  |  |

The residual Petzval curvature of the objective in this example is .696, whereas that of an objective constructed according to the specification of applications Serial Nos. 132,591 or 402,837 is .809, which shows an improvement of some twelve per cent in the residual curvature.

Figure 2:
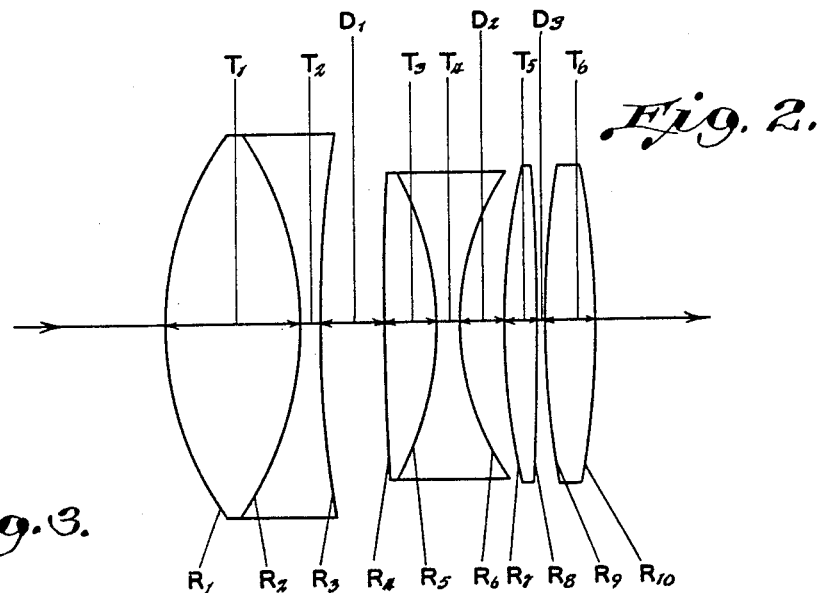
Fig. 2 shows a lens having a front component formed of a compound convergent member, and a rear component formed of a compound divergent member and two simple convergent members.

The numerical data of an objective of relative aperture F/1.4, constructed according to the present invention, as illustrated in Fig. 2, is given below. The notation of this example is the same as that used in the data above given, and the material is defined in the same terms.

|  |  |  | $n_D$ | $V$ | Chance Brothers' catalogue number |
|---|---|---|---|---|---|
| $R_1+ .5038$ | $T_1$ | .195 | 1.529 | 51.6 | 7863 |
| $R_2- .495$ | $T_2$ | .030 | 1.652 | 33.5 | 5093 |
| $R_3+ 2.250$ | $D_1$ | .100 | Air | | |
| $R_4+20.0$ | $T_3$ | .082 | 1.6437 | 48.3 | |
| $R_5- .4348$ | $T_4$ | .030 | 1.529 | 51.6 | 7863 |
| $R_6+ .4605$ | $D_2$ | .050 | Air | | |
| $R_7+ .8333$ | $T_5$ | .060 | 1.6133 | 59.0 | 4873 |
| $R_8-14.29$ | $D_3$ | .005 | Air | | |
| $R_9+ 1.099$ | $T_6$ | .070 | 1.6133 | 59.0 | 4873 |
| $R_{10}- 4.268$ | | | | | |

Figure 3:
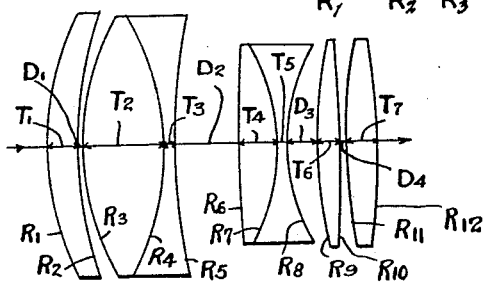
Fig. 3 shows diagrammatically a lens in which the front component is formed of a single simple convergent member and a compound convergent member, and the rear component is formed of a compound divergent member and two simple convergent members.

The numeral data of an objective of relative aperture F/1.4, constructed according to the present invention, as illustrated in Fig. 3, is given below. The notation of this example is the same as that used in the data given for the first two examples, and the material is defined in similar terms.

*Equivalent focal length 1.00"*

|  |  |  | $n_D$ | $V$ |
|---|---|---|---|---|
| $R_1+ .8350$ | $T_1$ | .067 | 1.613 | 59.1 |
| $R_2+ 1.427$ | $D_1$ | .005 | | |
| $R_3+ .6365$ | $T_2$ | .257 | 1.613 | 59.1 |
| $R_4- .6055$ | $T_3$ | .029 | 1.747 | 27.4 |
| $R_5+ 1.039$ | $D_2$ | .095 | | |
| $R_6-12.72$ | $T_4$ | .078 | 1.652 | 33.5 |
| $R_7- .4770$ | $T_5$ | .030 | 1.613 | 59.1 |
| $R_8+ .4990$ | $D_3$ | .048 | | |
| $R_9+ .7000$ | $T_6$ | .057 | 1.644 | 48.3 |
| $R_{10}-2.385$ | $D_4$ | .005 | | |
| $R_{11}+1.706$ | $T_7$ | .067 | 1.613 | 59.1 |
| $R_{12}-1.878$ | | | | |

It will be understood that the data given in the above tables are merely illustrative of a large number of different ways in which the principles of the invention can be applied.

What is claimed is:

1. An objective of the Petzval type, in which the front component is convergent and the back component comprises two convergent elements, and a divergent member compounded of a convergent element of high refractive index cemented to a divergent element of lower refractive index.

2. An objective of the Petzval type, in which the front component comprises two convergent members, one of which is a single element and the other a compound member whose cemented surface is dispersive, and in which the back component comprises a divergent member compounded of a convergent element of high refractive index cemented to a divergent element of lower refractive index, such divergent member having both its outer curvatures convex towards the incident light, and a convergent member behind the divergent member.

3. An objective of the Petzval type, in which the front component consists of two convergent members, one of which is compounded, and its cemented surface is dispersive, and the back component consists of two simple convergent members, and a divergent member compounded of a convergent element of high refractive index cemented to a divergent element of lower refractive index.

ARTHUR WARMISHAM.